(12) United States Patent
Bettles et al.

(10) Patent No.: US 11,275,488 B2
(45) Date of Patent: Mar. 15, 2022

(54) AUGMENTING USER INTERFACE TO CONVEY A STATE OF DRILLING OPERATIONS

(71) Applicant: International Business Machines Corporation, Armonk, NY (US)

(72) Inventors: James W. H. Bettles, Sacramento, CA (US); Monsu M. Mathew, Chicago, IL (US); Gordon Lerman, Chicago, IL (US); Megan K. Arp, Los Angeles, CA (US); Brandon K. Patterson, Colorado Springs, CO (US)

(73) Assignee: International Business Machines Corporation, Armonk, NY (US)

( * ) Notice: Subject to any disclaimer, the term of this patent is extended or adjusted under 35 U.S.C. 154(b) by 166 days.

(21) Appl. No.: 16/168,034

(22) Filed: Oct. 23, 2018

(65) Prior Publication Data
US 2020/0125225 A1   Apr. 23, 2020

(51) Int. Cl.
*G06F 3/0484* (2013.01)
*E21B 41/00* (2006.01)
(Continued)

(52) U.S. Cl.
CPC ........ *G06F 3/0484* (2013.01); *E21B 41/0092* (2013.01); *E21B 47/00* (2013.01);
(Continued)

(58) Field of Classification Search
CPC .... G06F 3/0484; G06F 16/273; G06F 16/258; G06F 16/275; G06F 2201/805;
(Continued)

(56) References Cited

U.S. PATENT DOCUMENTS 7,430,744 B2 * 9/2008 Straube ............... G06F 16/1844
719/313
9,035,750 B2   5/2015 Kong
(Continued)

OTHER PUBLICATIONS

Mell, Peter et al.; "The NIST Definition of Cloud Computing;" National Institute of Standards and Technology; Special Publication 800-145; Sep. 2011; 7 pages.

*Primary Examiner* — Mehmet Yesildag
*Assistant Examiner* — Ayanna Minor
(74) *Attorney, Agent, or Firm* — Schmeiser, Olsen & Watts, LLP; Stephanie Carusillo

(57) ABSTRACT

A system and method for generating a customized user interface showing a state of drilling operations at successive levels of drilling operations includes receiving synchronized data from a local server installed on each drilling rig of a fleet, analyzing the synchronized data with a real-time analytics engine including at least one predictive model to identify at least one drilling operation event associated with a drilling rig from the synchronized data, applying logic rules to calibrate outputs of the real-time analytics engine to determine a set of key performance indicators for the at least one drilling operation event from the drilling rig, and generating the customized user interface to be accessed by a user computing device to visualize the set of key performance indicators, wherein the customized user interface indicates a recommended change in drilling operations based on an analysis of the set of key performance indicators.

14 Claims, 11 Drawing Sheets

(51) Int. Cl.
*E21B 47/00* (2012.01)
*G06F 16/25* (2019.01)
*G06F 16/27* (2019.01)
*G06Q 10/06* (2012.01)
*G06N 20/00* (2019.01)

(52) U.S. Cl.
CPC .......... *G06F 16/258* (2019.01); *G06F 16/273* (2019.01); *G06N 20/00* (2019.01); *G06Q 10/06393* (2013.01)

(58) Field of Classification Search
CPC ..... G06N 20/00; E21B 41/0092; E21B 21/08; E21B 19/02; E21B 19/008; G06T 2211/428; G01B 9/027; G05B 2219/33252; G05B 2219/32005; G05B 2219/34399; G05B 2219/25369; G06Q 10/06393
See application file for complete search history.

(56) References Cited

U.S. PATENT DOCUMENTS

| | | |
|---|---|---|
| 9,122,700 B2 | 9/2015 | Grider et al. |
| 9,803,472 B2 | 10/2017 | Weatherhead et al. |
| 9,957,781 B2 | 5/2018 | Vennelakanti et al. |
| 2016/0053604 A1* | 2/2016 | Abbassian .............. E21B 45/00 702/6 |
| 2018/0298746 A1* | 10/2018 | Short ................... E21B 19/008 |

* cited by examiner

| KPI | Tone | Drilling Operation Event (DOE) | Tone | Level | Tone |
|---|---|---|---|---|---|
| KPI 1 | Tone 1 | DOE 1 | Tone 6 | Individual Rig | Tone 11 |
| KPI 2 | Tone 2 | DOE 2 | Tone 7 | Rig Class | Tone 12 |
| KPI 3 | Tone 3 | DOE 3 | Tone 8 | Area | Tone 13 |
| KPI 4 | Tone 4 | DOE 4 | Tone 9 | Fleet | Tone 14 |
| KPI 5 | Tone 5 | DOE 5 | Tone 10 | Global | Tone 15 |

FIG. 6A

| KPI | Phrase | Drilling Operation Event (DOE) | Phrase | Level | Phrase |
|---|---|---|---|---|---|
| KPI 1 | Phrase 1 | DOE 1 | Phrase 6 | Individual Rig | Phrase 11 |
| KPI 2 | Phrase 2 | DOE 2 | Phrase 7 | Rig Class | Phrase 12 |
| KPI 3 | Phrase 3 | DOE 3 | Phrase 8 | Area | Phrase 13 |
| KPI 4 | Phrase 4 | DOE 4 | Phrase 9 | Fleet | Phrase 14 |
| KPI 5 | Phrase 5 | DOE 5 | Phrase 10 | Global | Phrase 15 |

FIG. 6B

AUGMENTING USER INTERFACE TO CONVEY A STATE OF DRILLING OPERATIONS

TECHNICAL FIELD

The present invention relates to systems and methods for generating a customized user interface based on raw drilling rig sensor data, and more specifically to embodiments for augmenting a user interface to show a state of drilling operations at successive levels of drilling operations.

BACKGROUND

The economics of oil and gas drilling operations require efficient production. With respect to offshore drilling, measuring Site Specific Procedures (SSP) performance helps to establish baselines, which are critical for understanding efficiency drivers across a range of operating scenarios. However, operating scenarios of offshore drilling rigs tend to vary because offshore drilling rigs are exposed to a wide range of weather and sea conditions.

SUMMARY

An embodiment of the present invention relates to a method, and associated computer system and computer program product. A processor of a computing system receives synchronized data from a local server installed on each drilling rig of a fleet of drilling rigs, the local server transforming raw sensor data extracted from each drilling rig into a normalized form. The synchronized data is analyzed with a real-time analytics engine including at least one predictive model to identify at least one drilling operation event associated with a drilling rig from the synchronized data. Logic rules are applied to calibrate outputs of the real-time analytics engine to determine a set of key performance indicators for the at least one drilling operation event from the drilling rig. A customized user interface is generated to be accessed by a user computing device to visualize the set of key performance indicators, wherein the customized user interface indicates a recommended change in drilling operations based on an analysis of the set of key performance indicators.

BRIEF DESCRIPTION OF THE DRAWINGS

FIG. 6A depicts a table of assignments between KPIs and tones, in accordance with embodiments of the present invention.

FIG. 6B depicts a table of assignments between KPIs and phrases, in accordance with embodiments of the present invention.

DETAILED DESCRIPTION

Figure 1:
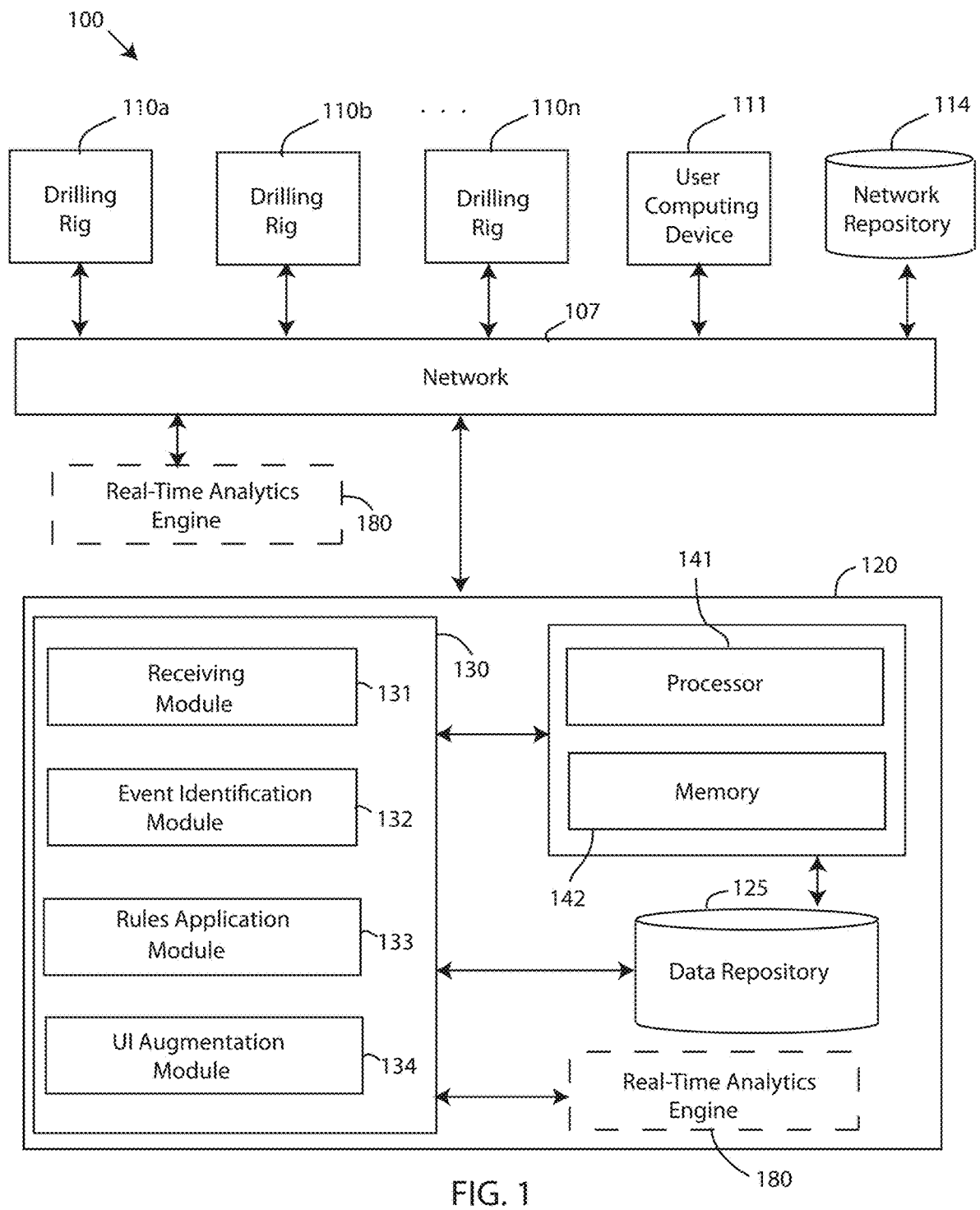
FIG. 1 depicts a block diagram of a drilling operation analytics system, in accordance with embodiments of the present invention.

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

In brief overview, embodiments of the present invention measure performance objectively with analytical methods, which is used to effectuate operational improvements for drilling operations events. Conventional methods to measure performance require manual inspections that are subject to human error. For instance, conventional methods of recording Site Specific Procedures (SSPs) involves a manual process of employees aboard an offshore drilling rig to observe approximate start and stop times when certain drilling operation events occur, and then locate separate supplemental data reports, such as International Association of Drilling Contractors (IADC), Casing Tally, Riser Configuration, etc., to extract additional details to calculate Key Performance Indicators (KPIs). Conventional methods are deficient because subjective interpretations are often flawed and vary too much between observers and require additional time to consult different sources to ultimately derive KPIs. Further, decisions made in the field based on subjective interpretations can greatly affect the accuracy of the KPIs. For example, a manual observer may optionally decide to group multiple events together in the same time-bounded report, making it impossible to unwind and measure quantitatively. The time to complete the process also varies depending on how quickly the manual observer can access supplemental data and perform the calculations.

Accordingly, embodiments of the present invention identify drilling operation events using raw sensor data from the drilling rig to calculates KPIs and ultimately to generate a custom user interface (UI), for example, a graphical user interface (GUI), that presents the KPI results in such a way to show a state of drilling operations on various levels of the drilling operation. The customized UI is generated and further augmented based on the raw sensor data collected at each drilling rig in a fleet of offshore drilling rigs. Embodiments of the present invention ingest and prepare raw sensor data, process the prepared raw sensor data with analytical systems, apply logic rules to calibrate the outputs of the analytical systems, and output KPI results for display in a dashboard, verbal description via a sound based UI, or any other likewise customized UI. For example, the UI is incorporated as part of a display of a wearable computing device, such as, for example, a computing device worn on the wrist of a user. In another example, the UI is incorporated as part of an audio system, such as, for example, a headset or other sound emitting device connected to a computing device. The system and method disclosed herein greatly reduce a manual effort on the manual observer's part to identify and measure drilling operations events, many of which cannot be observed manually or cannot be identified with by as many physical parameters as with embodiments of the present invention. Further, embodiments of the present invention runs on a scheduled basis, performs the identification and measurement of the drilling operations events, and present the output to the end user for quick visualization of a state of drilling rig operational data to allow for effective control of drilling operations at various levels of the drilling operation. Augmenting and updating a customized UI on a user computing device in real-time to display operational metrics/data at successive levels of operation, such as drill ship, fleet, and global, enables a user to pinpoint best practices and failing practices at each level of the drilling operations and then immediately transmit this knowledge to the rest of the drilling rig fleet to thereby improve drilling rig operational efficiency throughout the entire drilling rig operation.

Referring to the drawings, FIG. 1 depicts a block diagram of a drilling operation analytics system 100, in accordance with embodiments of the present invention. The drilling operation analytics system 100 is a system for generating a customized user interface showing a state of drilling operations at successive levels of drilling operations. For ease of understanding, embodiments that include graphical user interfaces are discussed hereinafter, but embodiments are not limited to only graphical user interfaces. The drilling operation analytics system 100 identifies drilling operation events associated with offshore drilling rigs and calculates KPIs that correspond to drilling operation metrics which can be aggregated and presented to a user via a GUI for effective control and streamlined visualization of a state of a drilling operation. The GUI depicts best practices and recommends changes to under-performing operations in real-time so that swift action can be taken to propagate best practices through the drilling rig fleet and modify under-performing drilling operations throughout the global fleet. Embodiments of the drilling operation analytics system 100 may be a drilling operations event detection system, a global fleet management system, an analytical detection system for detecting key drilling operations on offshore drilling rigs based upon structural movements of a drill ship over space and time, and the like.

The drilling operation analytics system 100 includes a computing system 120. Embodiments of the computing system 120 may be a computer system, a computer, a server, one or more servers, a cloud computing network/architecture, a backend computing system, and the like.

Furthermore, the drilling operation analytics system 100 includes a plurality of drilling rigs 110a, 110b . . . 110n, and at least one user computing device 111, which are communicatively coupled to the computing system 120 over a network 107. For instance, information/data is transmitted to and/or received from the drilling rigs 110a, 110b . . . 110n, and the user computing device 111 over a network 107. A network 107 may be a cloud computing network. Further embodiments of network 107 may refer to a group of two or more computer systems linked together. Network 107 may be any type of computer network known by individuals skilled in the art. Examples of network 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the network 107 may be a peer-to-peer network in some embodiments, wherein in other embodiments, the network 107 may be organized as a client/server architecture.

In some embodiments, the network 107 further comprises, in addition to the computing system 120, a connection to one or more network-accessible knowledge bases 114, which are network repositories containing information relating to drilling rig component information, drilling operation history, past changes to operations, best practices information, GUI layouts, etc., network repositories or other systems connected to the network 107 that may be considered nodes of the network 107. In some embodiments, where the computing system 120 or network repositories allocate resources to be used by the other nodes of the network 107, the computing system 120 and network-accessible knowledge bases 114 may be referred to as servers.

The network-accessible knowledge bases 114 are a data collection area on the network 107 which backs up and saves all the data transmitted back and forth between the nodes of the network 107. For example, the network repository may be a data center saving and cataloging drilling rig component information, drilling operation history, past changes to operations, best practices information, GUI layouts, and the like, to generate both historical and predictive reports regarding a particular drilling operation environment. In some embodiments, a data collection center housing the network-accessible knowledge bases 114 may include an analytic module capable of analyzing each piece of data being stored by the network-accessible knowledge bases 114. Further, the computing system 120 may be integrated with or as a part of the data collection center housing the network-accessible knowledge bases 114. In some alternative embodiments, the network-accessible knowledge bases 114 are a local repository that is connected to the computing system 120.

Embodiments of the drilling rigs 110a, 110b . . . 110n are rigs, such as offshore drilling rigs as used in the oil and gas industry. The reference numbers with sub-letters and/or ellipses, for example describing components as 110a, 110b . . . 110n signifies that the embodiments are not limited only to the amount of elements actually shown in the drawings, but rather, the ellipses between the letters and the $n^{th}$ element indicate a variable number of similar elements of a similar type. For instance, with regard to the drilling rigs 110a, 110b . . . 110n depicted in FIG. 1, any number of a plurality of drilling rigs may be present up to the $n^{th}$ number of drilling rigs, wherein the variable "n" may represent the last element in a sequence of similar elements shown in the drawing. A drilling rig can also be a ship, a carrier, an offshore rig, and any similar industry operation that is drilling for oil in open water. The drilling rigs 110a, 110b . . . 110n are part of a global fleet of drilling rigs, ships, and other components shown schematically in FIG. 1.

Figure 2:
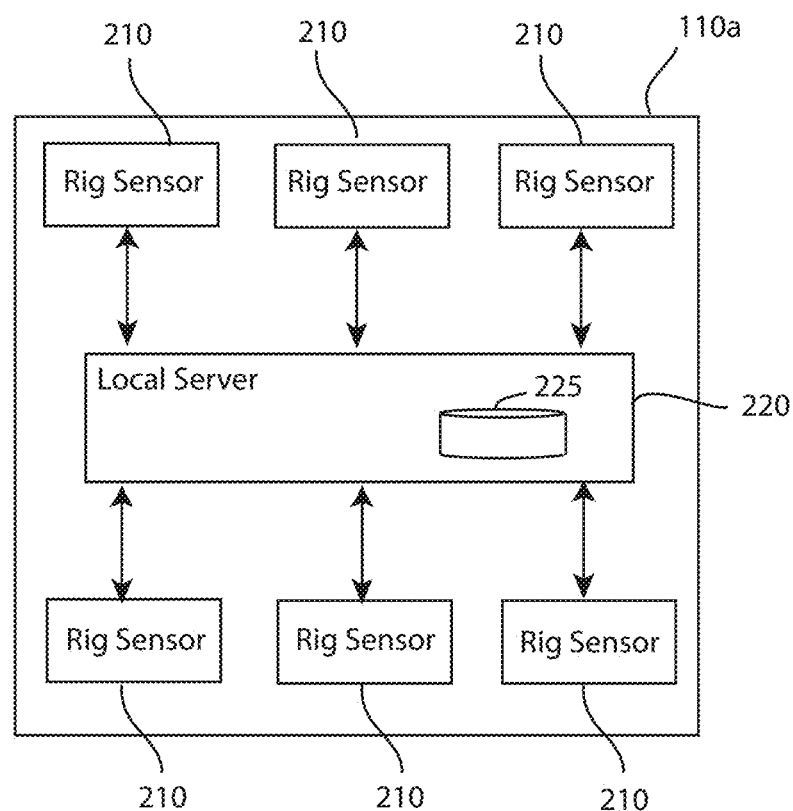
FIG. 2 depicts a block diagram of a drilling rig, in accordance with embodiments of the present invention.

FIG. 2 depicts a block diagram of a drilling rig 110a, in accordance with embodiments of the present invention. The drilling rig 110a includes a plurality of rig sensors 210 and at least one time-series database 225 coupled to a local server 220. The rig sensors 210 are integrated throughout the drilling rig 110a to provide raw sensor data to the local server 220, which are developed, installed, and maintained under OEM rules and maintenance procedures. While a single local server 220 is shown in the illustrated embodiment, more than one local server can be installed on the drilling rig 110a. In an exemplary embodiment, two local servers 220 are installed on each drilling rig 110a of the drilling rig fleet to support the ability to securely and reliably extract raw sensor data from the rig sensors 210. The local servers 220 can be edge devices installed on the drilling rig 110a. Moreover, the drilling rig 110a includes a time-series database 225 coupled to the local server 220 for staging the extracted raw sensor data. The time-series database 225 is a database optimized for the time-stamped raw sensor data acquired from the rig sensors 210. The time-stamped raw sensor data stored in the time-series database 225 represented measurements and/or events associated with the drilling rig 110a and components of the drilling rig 110a that are being monitored, tracked, and analyzed by the drilling operation analytics system 100.

Referring back to FIG. 1, embodiments of the drilling operation analytics system 100 include a user computing system 111. The user computing device 111 may be a computing device, a computer, a desktop computer, a cell phone, a mobile computing device, a tablet computer, a laptop computer, a wearable computing device, a smartwatch, an augmented reality device, and the like, which may be used to access a customized GUI created by the drilling operation analytics system 100. The user computing device 111 may include hardware functionality such as a speaker for emitting a sound, a vibration motor for creating vibrations, a display for displaying images, videos, pictorial sequences, etc., a light emitting element for emitting a light, a receiver for receiving communications, a transmitter for transmitting signals, and other similar features and hardware of a computer, smartphone, smartwatch, cell phone, tablet computer, and the like.

The drilling operation analytics system 100 further includes a real-time analytics engine 180. The real-time analytics engine 180 can be locally coupled to the computing system 120, or can be coupled to the computing system 120 and the drilling rigs 110a, 110b . . . 110n over network 107. The real-time analytics engine 180 includes at least one predictive model to identify at least one drilling operation event associated with a drilling rig. The predictive model used by the real-time analytics engine 180 employs many different algorithmic models. In an exemplary embodiment, the real-time analytics engine 180 uses Random Forests prediction model to analyze data, identify drilling operation events, and calculate KPIs.

Furthermore, the computing system 120 of the drilling operation analytics system 100 is equipped with a memory device 142 which stores various data/information/code, and a processor 141 for implementing the tasks associated with the drilling operation analytics system 100. A drilling operation analytics application 130 is loaded in the memory device 142 of the computing system 120. The drilling operation analytics application 130 may be an interface, an application, a program, a module, or a combination of modules. In an exemplary embodiment, the drilling operation analytics application 130 is a software application running on one or more back end servers, servicing one or more production environments.

The drilling operation analytics application 130 of the computing system 120 includes a receiving module 131, an event identification module 132, a rules application module 133, and a UI augmentation module 134. A "module" refers to a hardware-based module, software-based module or a module that is a combination of hardware and software. Embodiments of hardware-based modules include self-contained components such as chipsets, specialized circuitry and one or more memory devices, while a software-based module is part of a program code or linked to the program code containing specific programmed instructions, which is loaded in the memory device of the computing system 120. A module (whether hardware, software, or a combination thereof) is designed to implement or execute one or more particular functions or routines.

Embodiments of the receiving module 131 include one or more components of hardware and/or software program code for receiving synchronized data from a local server installed on each drilling rig of a fleet of drilling rigs 110a, 110b . . . 110n. For instance, data acquired from the rig sensors 210 by the local server(s) 220 is transmitted over network 107 (e.g. via satellite) to the computing system 120 for calculating KPIs and building a customized GUI. In an exemplary embodiment, the local server 220 comprised two servers that are installed on each drilling rig 110a, 110b . . . 110n to support the ability to securely and reliably extract raw sensor data. The first of two servers is referred to as "OT Server" that is compliant with client standards. The OT Server has a combination of software from client specific software and software associated with the drilling operation analytics application 130 to allow extraction of raw sensor data (i.e. tag/value/timestamp) directly from Programmable Logic Controllers (PLCs) integrated with the rig sensors 210. The PLCs acquire the raw sensor data at an interval of every second via the OT server installed on the drilling rig 110a, 110b . . . 110n. The client software polls the PLCs using TCP/IP and exposes the data via a protocol called "OPC Classic". The software specific to the drilling operation analytics application 130 resides on the same box and polls the OPC server via an OPC client and reliably forwards the data across a firewall to a second server local to the drilling rig 110a, 110b . . . 110n; the second server can be an edge appliance. The firewall between the first local server (i.e. OT Server) and the second local server (i.e. edge appliance) can be configured to only allow connections outbound from the OT Server, and only to the specific IP address, which creates a secure environment that is compliant with customer security policies.

Moreover, the raw sensor data extracted from the rig sensors 210 is transformed by the local server(s) 220 into a normalized form prior to being received by the receiving module 131 of the computing system 120. For instance, the local server 220, or the second server as described above, receives the raw sensor data. Examples of raw sensor data are measurements along an X-axis, measurements along a Y-axis, measurements along a Z-axis, an environmental temperature, a humidity level, a current weather condition, a precipitation measurement, and the like. The receiving module 131 transforms tag names to a normalized form with business meaning, as understood at least within the drilling operations industry. For example, raw sensor data reading "SDI_A0111" is transformed to "HookSpeed," which is a parameter/measurable of a physical component of the drilling rig 110a, 110b . . . 110n. In response to the raw sensor data being transformed, the local server 220 distributes the transformed raw sensor data to two destinations.

The first destination is a time-series database 225, where the transformed raw sensor data is indexed and optimized for time-series queries, which is a primary focus of a first phase of calculating KPIs. Once the transformed raw sensor data is safely in the local time-series database 225, the transformed data is transactionally and asynchronously replicated over the network. In an exemplary embodiment, the time-indexed, transformed raw sensor data stored in the time-series database 225 is transmitted to the computing system 120 via a satellite link. The time-series database replication is designed to work over high latency networks, provides for in-doubt message resolution, and ensures that the data is synchronized between the rig and the cloud computing network. The data stored in the time-series database 225 and transmitted to the receiving module 131 from the local server is referred to as "synchronized data."

The second destination is the real-time analytics engine 180 which can evaluate the data in real-time locally, performing predictive analytics, and evaluating rules that can be configured centrally from the cloud computing network, as described in greater detail infra. The rules can be configured for a variety of actions, such as sending email or creating work orders to respond to equipment operation anomalies.

Figure 3:
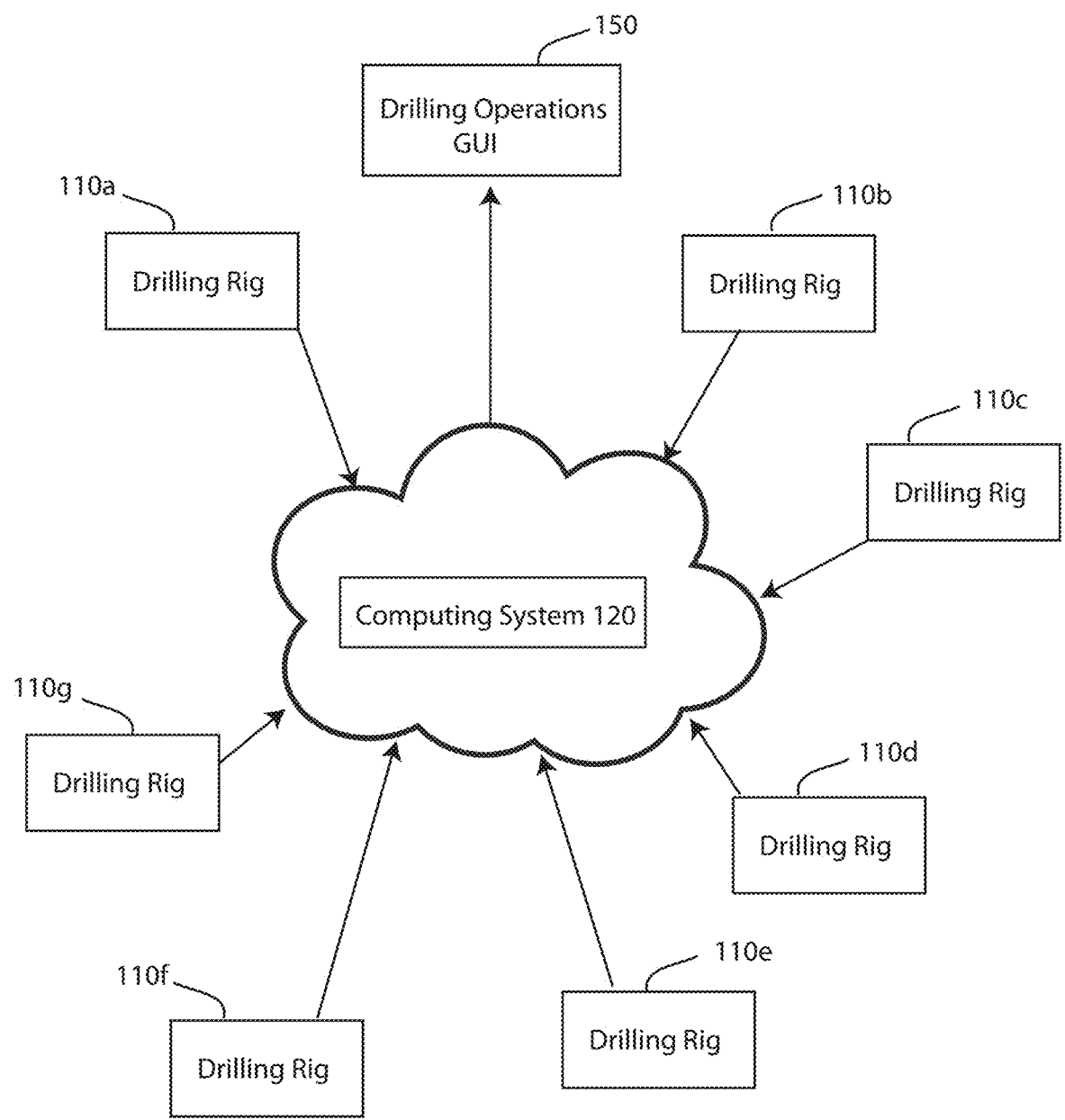
FIG. 3 depicts a schematic diagram of the drilling operation analytics system, in accordance with embodiments of the present invention.

Accordingly, synchronized data extracted from physical, real-world components is communicated to a central cloud system included in the cloud computing network, where one or more computing systems 120 reside. FIG. 3 depicts a schematic diagram of the drilling operation analytics system 100, in accordance with embodiments of the present invention. As shown in the illustrated embodiment, computing system 120 is a centrally located computing system included in the cloud computing network. A plurality of drilling rigs 110a, 110b, 110c, 110d, 110e, 110f, 110g are connected to the central computing system 120. Synchronized data is sent from the plurality of drilling rigs 110a, 110b, 110c, 110d, 110e, 110f, 110g over a network, such as a satellite network, to the computing system 120. The computing system 120 builds, generates, augments, creates, or otherwise outputs a customized GUI based on the synchronized data, which allows for a user to visualize a state of drilling operations for one, some, or all of the drilling rigs 110a, 110b, 110c, 110d, 110e, 110f, 110g. The state of the drilling operations is visualized by the user when the computing system 120 augments the GUI of a user computing device 111 to include one or more windows showing KPIs for various levels of the drilling operation, as described in greater detail infra.

Referring back to FIG. 1, the computing system 120 includes an event identification module 132. The event identification module 132 includes one or more components of hardware and/or software program code for analyzing the synchronized data with the real-time analytics engine 180 including at least one predictive model to identify at least one drilling operation event associated with a drilling rig 110a, 110b . . . 110n from the synchronized data. Examples of drilling operation events, which may also be referred to as tubular events, include but are not limited to: running/pulling risers, running/pulling drill pipe, running casing, and the like. The event identification module 132 utilizes the real-time analytics engine 180 to predict or otherwise determine a type of drilling operation and when the drilling operation is occurring based on the synchronized data received from the local drilling rig server 220, as described supra. The analytics process follows Cross-Industry Standard Process for Data Mining (CRISP-DM) methodology to identify drilling operation events.

By way of example, the synchronized data can be used to identify event occurrences of a drilling operation event (e.g., trip into hole (TIH) with drillpipe), and when the drilling operation event occurs. The raw data, when transformed, creates a variety of features, such as a moving average, measurements along space and time, standard deviations, principal components, and the like, which are fed into a supervised learning model operated by the real-time analytics engine 180. Additional data sources can also be inputs to the predictive model of the real-time analytics engine 180, such as RimDRILL, IADC Reports, sensor time series data, riser and casing configurations, and the like. The real-time analytics engine 180 uses additional statistical software to complete various data science routines, including staging data, performing necessary integrations, transformations of data, analytical modeling with advanced algorithms, evaluation, and outputs for deployment. Many algorithmic models can be used to predict and/or determine an outcome relating to a drilling operation event based on the synchronized data. In an exemplary embodiment, a Random Forest model is used to calculate the predictions for the drilling operation events, including a type of drilling operation event and a time when the drilling operation event occurred. Random forest model (i.e. multiple learners) is an artificial intelligence algorithm that creates multiple models with datasets created using a Bootstrap Sampling method, and then creates multiple models by using the same algorithm on the different generated component sets. Unlike a decision tree, where each node is split on the best feature that minimizes error, in random forests, a random selection of features is chosen for constructing the best split. The reason for randomness is when decision trees choose a best feature to split on, the splits end up with similar structure and correlated predictions. The number of features to be searched at each split point is specified as a parameter to the random forest algorithm. Thus, each decision tree is constructed using a random sample of records and each split is constructed using a random sample of predictors. Another predictive model that can be used is Bayes' Theorem, which calculates the probability of an outcome given the value of a variable to calculate the probability of a hypothesis(h) being true, given prior knowledge(d). Another predictive model that can be used to calculate the predictions for the drilling operation events, including a type of drilling operation event and a time when the drilling operation event occurred is adaptive boosting (e.g. a machine learning meta-algorithm) that utilizes bagging and boosting techniques. Bagging is a parallel ensemble because each model is built independently. On the other hand, boosting is a sequential ensemble where each model is built based on correcting the misclassifications of the previous model. Bagging mostly involves 'simple voting', where each classifier votes to obtain a final outcome that is determined by the majority of the parallel models. Boosting involves 'weighted voting', where each classifier votes to obtain a final outcome that is determined by the majority, but the sequential models were built by assigning greater weights to misclassified instances of the previous models. Other predictive models can be used, and these models can be used in combination with each other to calculate the predictions for the drilling operation events, including a type of drilling operation event and a time when the drilling operation event occurred.

The computing system 120 also includes a rules application module 133. The rules application module 133 includes one or more components of hardware and/or software program code for applying logic rules to calibrate outputs of the real-time analytics engine 180 (i.e. the identified drilling operation event) to determine a set of key performance indicators (KPIs) for the at least one drilling operation event from the drilling rig. For instance, the rules application module 133 translates the complex operational movements of the drilling rigs 110*a*, 110*b* . . . 110*n* into digital data at a second-to-second level. From here, the algorithms break down the identified drilling operation event into individual cycles, or stands of tubular, providing a clear metric for a total number of stands run or pulled, elapsed time, as well as rate of movement. The rules application module further applies business and logic rules to translate the output from the real-time analytics engine 180 (e.g. the identified drilling operation event) to create values for calculating the specific KPI metrics; these values are in effect critical modeling precursors that are fed through a series of advanced data transformations and predictive modeling routines to isolate which signals correspond to specific KPI events of interest, filtering out noise and false positives in the process. The calculated KPIs define operating metrics that can be rolled up into various aggregations to provide a higher-level information on performance of the drilling operation. The main KPIs that this system incorporates include riser run and pull rates, casing run rates (e.g. identifying singles, doubles or tripled stands) and drill pipe run and pull rates. The same system encompasses additional KPI routines to manage days to depth, penetration rate, and time spend drilling. The KPI metrics are calculated at various levels of the drilling operation. For example, the rules application module 133 calculates KPIs at an individual rig level, a rig class level which comprises a plurality of similar drilling rigs, an area level which comprises a particular geographic area where the drilling rigs are located, and a fleet level which comprises all drilling rigs and components.

The computer system 120 also includes a UI augmentation module 134. The UI augmentation module 134 includes one or more components of hardware and/or software program code for generating, building, creating, or augmenting a customized user interface to be accessed by a user computing device 111 to visualize or otherwise communicate the set of key performance indicators. For instance, the UI augmentation module 134 outputs the KPIs to for displaying a GUI, such as a dashboard, accessible by the user using the user computing device 111. The UI augmentation module 134 augments the GUI on the user computing device 111 to provide real-time information (e.g. KPIs) regarding a state of drilling operations based on raw sensor data extracted from rig sensors installed on the drilling rigs. The augmentation of the custom GUI can be uniquely tailored based on a user level of access within the drilling operations. For example, a user possessing a required level of access may be presented with additional information about the state of drilling operations at successive levels of the drilling operation operations than another user with a lower level of access clearance. As a result, the GUI on each user's device is augmented by the UI augmentation module 134 differently based levels of access or security clearance. By way of example, a GUI created and outputted to a first user computing device associated with a first user can include KPIs related to an individual drilling rig, a GUI created and outputted to a second user computing device associated with a second user can include KPIs related to individual drilling rigs within an area, and a GUI created and outputted to a third user computing device associated with a third user can include KPIs related to the entire global fleet of drilling rigs, based on a level of access of the users.

Moreover, the customized GUI indicates a recommended change in drilling operations based on an analysis of the set of key performance indicators. For example, the UI augmentation module 134 can augment the customized UI to display or otherwise present to the user a recommended change for under-performing drilling rigs, based on the KPIs. The UI augmentation module 134 can also alert users to best practices based on a comparison of the KPIs across multiple levels of the drilling operation so that the user is quickly notified of a potential change to make in real-time to increase the efficiency of the drilling operation. Further, the GUI augmentation module 134 indicates correlations between KPIs and drilling operation events to further improve the efficiency of the drilling operations. For example, if a particular drilling operation event is resulting in favorable performance, the GUI augmentation module 134 can further customize the GUI to include such information. The correlation information displayed on the GUI can be helpful in understanding the environmental conditions and other parameters surrounding the drilling rig when the drilling operation event occurred and resulted in favorable performance.

Figure 4:
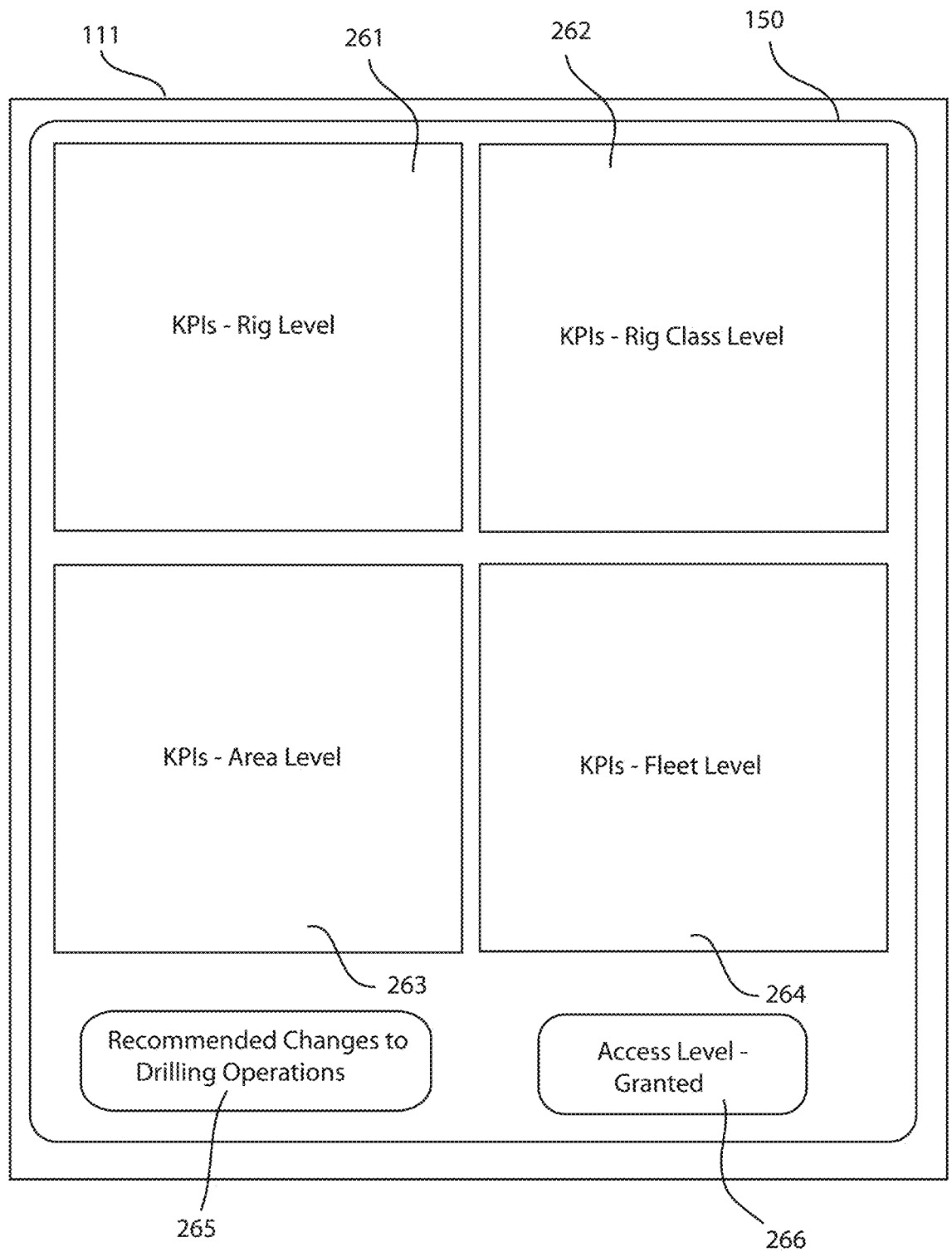
FIG. 4 depicts a customized graphical user interface (GUI) showing a state of drilling operations, in accordance with embodiments of the present invention.

The output KPIs can be arranged in many different views on the GUI for effectively displaying drilling rig operations. FIG. 4 depicts a customized GUI 150 showing a state of drilling operations, in accordance with embodiments of the present invention. The GUI 150 is generated by the GUI augmentation module 134 for visualization on the user computing device 111. The customized GUI 150 includes a plurality of windows 261, 262, 263, 264 that depict the calculated KPIs for varying levels of the drilling operation, Window 261 depicts the KPIs at an individual rig level. Window 262 depicts the KPIs at a rig class level. Window 263 depicts KPIs at an area level. Window 264 depicts KPIs at a fleet level. In the illustrated embodiment, the customized GUI 150 visualizes KPIs for multiple levels of the drilling operation. The customized GUI 150 can be augmented to reduce or eliminate one or more windows based on a level of access granted to a particular user. Additionally, customized GUI 150 includes an icon 265 displaying recommended changes and an icon 266 which shows an access level of the user associated with the user computing device 111. Various arrangements of windows and icons can be generated by the GUI augmentation module 134 to customize a final GUI, not shown in FIG. 4. or example, the KPIs at various levels can be arranged in smaller windows with a single, larger window displaying real-time KPIs for a selected level of drilling operation. The GUI may further be augmented to include data regarding drilling operation events that have occurred in the last 24 hours, etc. Accordingly, the customized GUI can be augmented to include KPIs and other information for quick visualization of a state of drilling operations in real-time, using raw sensor data extracted from rig sensors installed on individual drilling rigs.

In alternative embodiments, the UI augmentation module 134 generates, builds, creates, or augments a customized non-visual user interface to communicate the set of key performance indicators to individuals. A non-visual user interface includes sound/voice based systems that can tonally/verbally convey information about the state of drilling operations using the calculated KPIs. The non-visual user interface augmentation can be helpful for instances on drilling rigs where a technician is not always near a terminal/display, or is wearing noise reducing earmuffs with a built in communication system. The built-in communication system may be a component of a wearable device, such as a set of headphones, noise reducing earmuffs, personal wearable sound system, and the like, which could be used to convey the pertinent information. For example, the UI augmentation module 134 uses a set of rules to match determined conditions and/or calculated KPIs to a requirement associated with a phrase, sound, sequence of notes, songs, sound effects, etc. that indicates the KPI and other pertinent information. When the requirements are met the condition is tonally (e.g., verbally) conveyed to the user. By way of example, in addition to or as an alternative to spoken phrases, a sequence of specific tones may be used to convey a specific KPI to the user, while another distinct tone indicates the drilling event and/or the drilling rig within the fleet. Verbal phrases would likely be more customizable to reflect certain conditions, e.g., pressure values etc. While the tones would be more general, such as pressure or drill angle is above or below a threshold. For example, a tone indicating pressure is above a threshold, followed by a verbal conveyance of the actual pressure reading.

Figure 5:
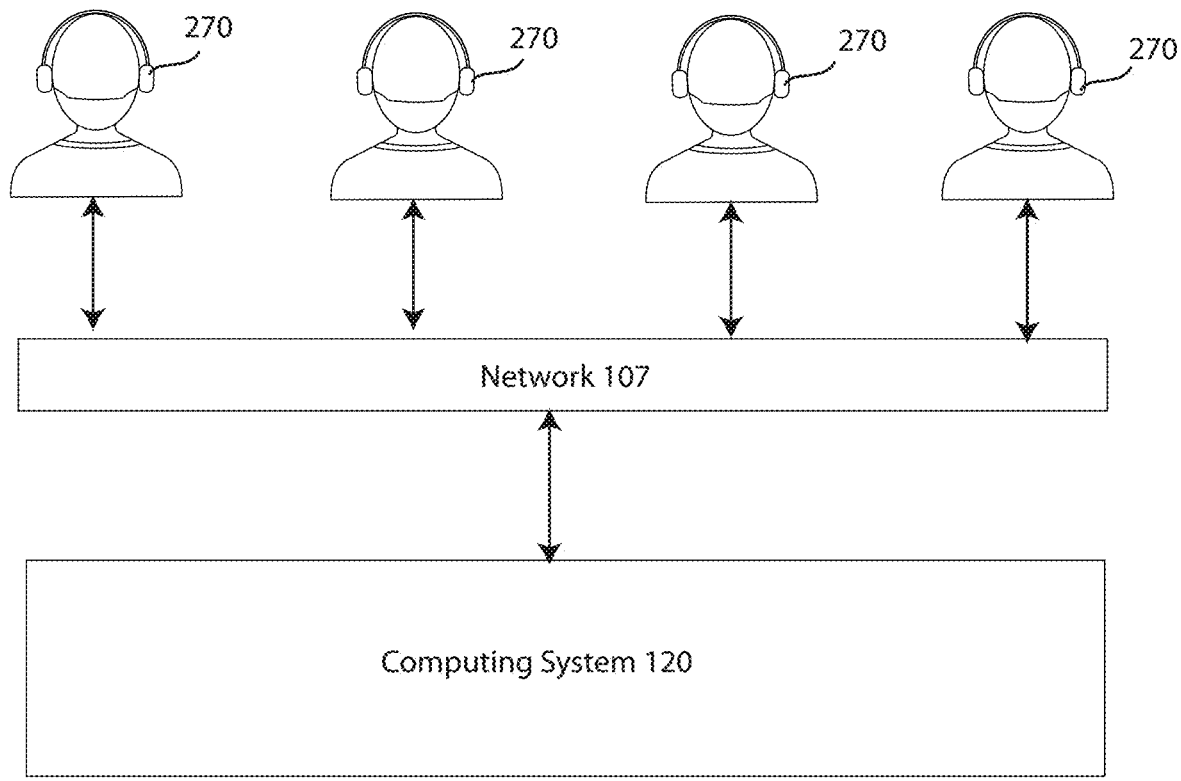
FIG. 5 depicts an embodiment of the drilling operation analytics system that augments a non-visual user interface to convey a state of drilling operations, in accordance with embodiments of the present invention.

FIG. 5 depicts an embodiment of the drilling operation analytics system 100 that augments a non-visual user interface to convey a state of drilling operations, in accordance with embodiments of the present invention. In the illustrated embodiment, the non-visual user interface is embodied as a user-wearable head accessory 270. The head accessory can be earmuffs, headphones, a headset, and the like, which includes a communication system or other sound-based system that emits soundwaves perceptible by the user. The computing system 120 (i.e. UI augmentation module 134) sends digital audio files over the network 107 to user-wearable head accessories 270 worn by a plurality of users. The plurality of users can be technicians located on an offshore drilling rig or managers located offsite. The user-wearable head accessory 270 converts the digital audio signals to real-world sound waves perceptible by the user. The sound waves are uniquely associated with a particular KPI, drilling operation event, level, and/or the like. The sound emitted by the user-wearable head accessory 270 can be a tone, such as a musical note or sequence of notes, or can be a spoken phrase (e.g. word or combination of words). Tones and/or phrase can be assigned to a distinct KPI, drilling operation event, level, and the like. Sequences of tones and phrases can then be emitted through the user-wearable head accessory 270 worn by the user to indicate to the user a state of drilling operations. FIG. 6A depicts a table of assignments between KPIs and tones, in accordance with embodiments of the present invention. Different KPIs, drilling operation events, levels are assigned a tone. If tone 1 is emitted, the user will understand that KPI 1 is being referred to. If tone 7 is emitted, the user will understand that DOE 2 is being referred to. A tone sequence can be emitted to provide a more complete understanding to the user, such as a sequence of tone 1, tone 7, and tone 14. In this sequence, the non-visual user interface has been augmented such that the user-wearable head accessory 270 emits a tone sequence that conveys the state of drilling operations as understood using KPI 1 and DOE 2 at a fleet level. Further tones can be used to provide a positive or negative connotation to the KPI, or if a threshold value has been exceeded. Similarly, FIG. 6B depicts a table of assignments between KPIs and phrases, in accordance with embodiments of the present invention. Different KPIs, drilling operation events, levels are assigned a phrase. If phrase 1 is emitted, the user will understand that KPI 1 is being referred to. If phrase 7 is emitted, the user will understand that DOE 2 is being referred to. A phrase sequence can be emitted to provide a more complete understanding to the user, such as a sequence of phrase 1, phrase 7, and phrase 14. In this sequence, the non-visual user interface has been augmented such that the user-wearable head accessory 270 emits a phrase sequence that conveys the state of drilling operations as understood using KPI 1 and DOE 2 at a fleet level. Further phrases can be used to provide a positive or negative connotation to the KPI, or if a threshold value has been exceeded. Various tasks and specific functions of the modules of the computing system 120 may be performed by additional modules or may be combined into other module(s) to reduce the number of modules. Further, embodiments of the computer or computer system 120 may comprise specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry may include proprietary specially designed components (e.g., a specialized integrated circuit, such as for example an Application Specific Integrated Circuit (ASIC), designed for only implementing methods of the present invention).

Embodiments of the drilling operation analytics system 100 reduce a time that a drilling operation is potentially exposed to inefficiencies at various levels of the drilling operation. Exposure to inefficiencies can be an indication that one or more components of the drilling operation is failing or otherwise not functioning properly. In the event that a drilling operation event is detected that results in poor performance of the drilling rig operation, the poor performance is uniquely displayed in real-time to a user so that corrective action can be taken much sooner than with conventional evaluation methods, saving costs and resources in eliminating the inefficiency or avoiding similar inefficiencies with other drilling rigs in the fleet. Conversely, in the event that a drilling operation event is detected that results in favorable performance of the drilling rig operation, the favorable performance is uniquely displayed in real-time to a user so that the successful drilling operation event can be spread through the entire fleet to increase an overall efficiency of the drilling operation.

Furthermore, the drilling operation analytics 100 improves management and control of a drilling operation that extends to many drilling rigs located offshore and in remote locations. Without using the drilling operation analytics system 100, a user has to manually evaluate drilling operation events and subjectively interpret a success of SSPs. The drilling operation analytics system 100 provides a technical solution to the above-drawbacks because the system 100 extracts raw sensor data from sensors installed on multiple drilling rigs and transforms the raw sensor data into visual performance indicators outputted in real-time to a custom GUI so that users can processes multiple streams of information faster and swiftly take an action that modifies the drilling operation to prevent further damage to drilling components in the event of a failing component, eliminate an inefficiency with a particular drilling operation event, or to increase an efficiency of the drilling operation by propagating a successful drilling operation event to other drilling rigs in the fleet. The technical solution(s) described herein is necessarily rooted in computer technology in order to overcome a problem specifically arising in the realm of drilling rig operation and control.

Figure 7:
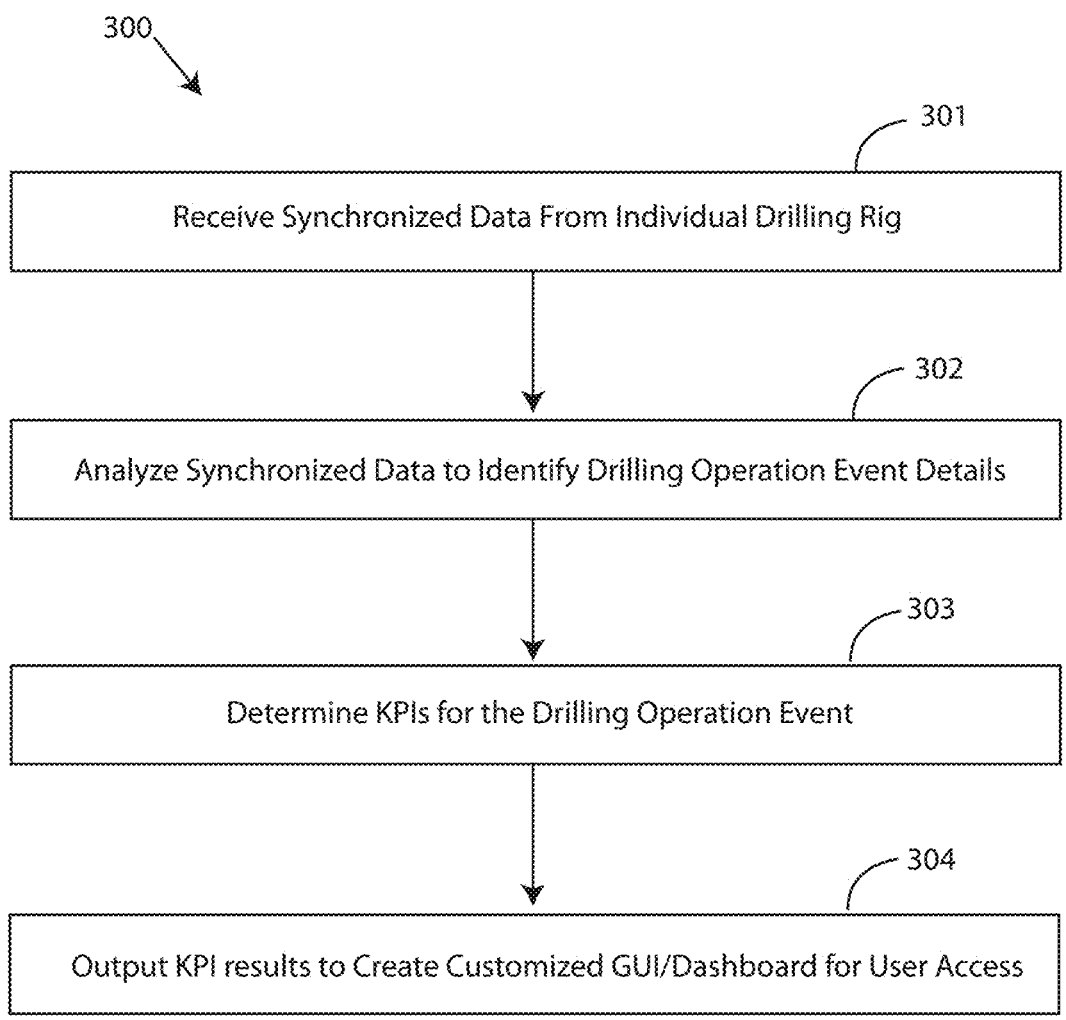
FIG. 7 depicts a flow chart of a method for generating a customized graphical user interface showing a state of drilling operations at successive levels of drilling operations, in accordance with embodiments of the present invention.

Referring now to FIG. 7, which depicts a flow chart of a method 300 for generating a customized graphical user interface showing a state of drilling operations at successive levels of drilling operations, in accordance with embodiments of the present invention. One embodiment of a method 300 or algorithm that may be implemented for generating a customized graphical user interface showing a state of drilling operations at successive levels of drilling operations with the drilling operation analytics system 100 described in FIGS. 1-6B using one or more computer systems as defined generically in FIG. 9 below, and more specifically by the specific embodiments of FIG. 1.

Embodiments of the method 300 for generating a customized graphical user interface showing a state of drilling operations at successive levels of drilling operations, in accordance with embodiments of the present invention, may begin at step 301 wherein synchronized data is received from individual drilling rigs. Step 302 analyzes the synchronized data to identify drilling operation event details. Step 303 determines KPIs for the drilling operation event. Step 304 outputs the KPIs to create a customized GUI for user access and real-time visualization of a state of drilling operations.

Figure 8:
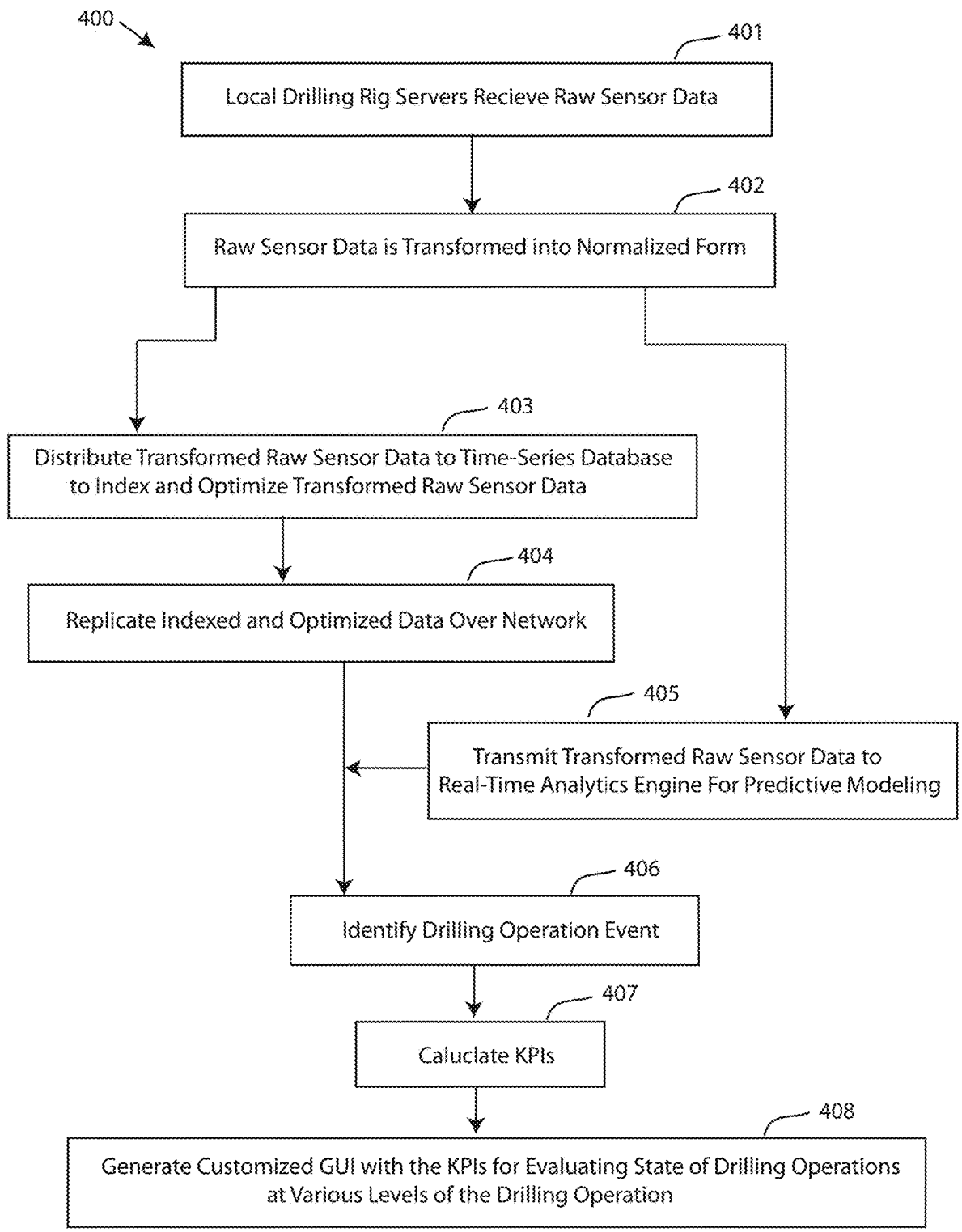
FIG. 8 depicts a more detailed flow chart of a method for generating a customized graphical user interface showing a state of drilling operations at successive levels of drilling operations, in accordance with embodiments of the present invention.

FIG. 8 depicts a more detailed flow chart of a method 400 for generating a customized graphical user interface showing a state of drilling operations at successive levels of drilling operations, in accordance with embodiments of the present invention. At step 401, local drilling rig servers receive raw sensor data. At step 402, the raw sensor data is transformed into normalized form. At step 403, the transformed raw sensor data is distributed to a time-series database to index and optimize the transformed raw sensor data. At step 404, the indexed and optimized transformed raw sensor data is replicated over the network. At step 405, the transformed raw sensor data is transmitted to a real-time analytics engine for predictive modeling, along with the replicate data from the time-series database. At step 406, the drilling operation event is identified using the predictive modeling. At step 407, the KPIs are calculated for the drilling operation event. At step 408, a customized GUI with the KPIs is generated for evaluation and/or visualizing a state of drilling operations at various levels of the drilling operation.

Figure 9:
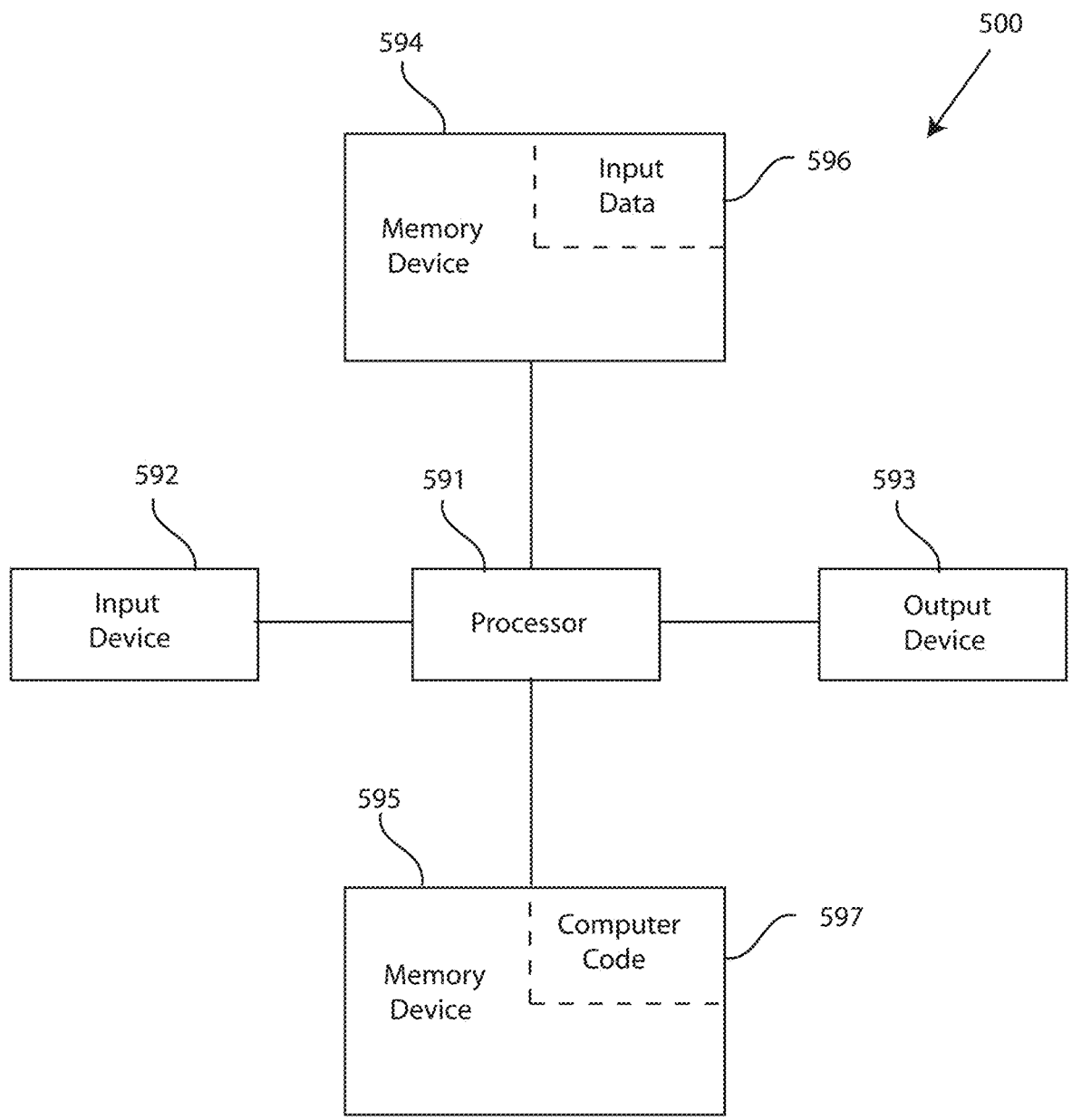
FIG. 9 depicts a block diagram of a computer system for the drilling operation analytics system of FIGS. 1-6B, capable of implementing methods for generating a customized graphical user interface showing a state of drilling operations at successive levels of drilling operations of FIGS. 7-8, in accordance with embodiments of the present invention.

FIG. 9 depicts a block diagram of a computer system for the drilling operation analytics system of FIGS. 1-6B, capable of implementing methods for generating a customized graphical user interface showing a state of drilling operations at successive levels of drilling operations of FIGS. 7-8, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for generating a customized graphical user interface showing a state of drilling operations at successive levels of drilling operations in the manner prescribed by the embodiments of FIGS. 7-8 using the drilling operation analytics system 100 of FIGS. 1-6B, wherein the instructions of the computer code 597 may be executed by processor 591 via memory device 595. The computer code 597 may include software or program instructions that may implement one or more algorithms for implementing the method for generating a customized graphical user interface showing a state of drilling operations at successive levels of drilling operations, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 9.

In some embodiments, the computer system 500 may further be coupled to an Input/Output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to generating a customized graphical user interface showing a state of drilling operations at successive levels of drilling operations. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 causing the computer system to trigger a recovery action during a component disruption in a production environment. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a method for generating a customized graphical user interface showing a state of drilling operations at successive levels of drilling operations. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for generating a customized graphical user interface showing a state of drilling operations at successive levels of drilling operations.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
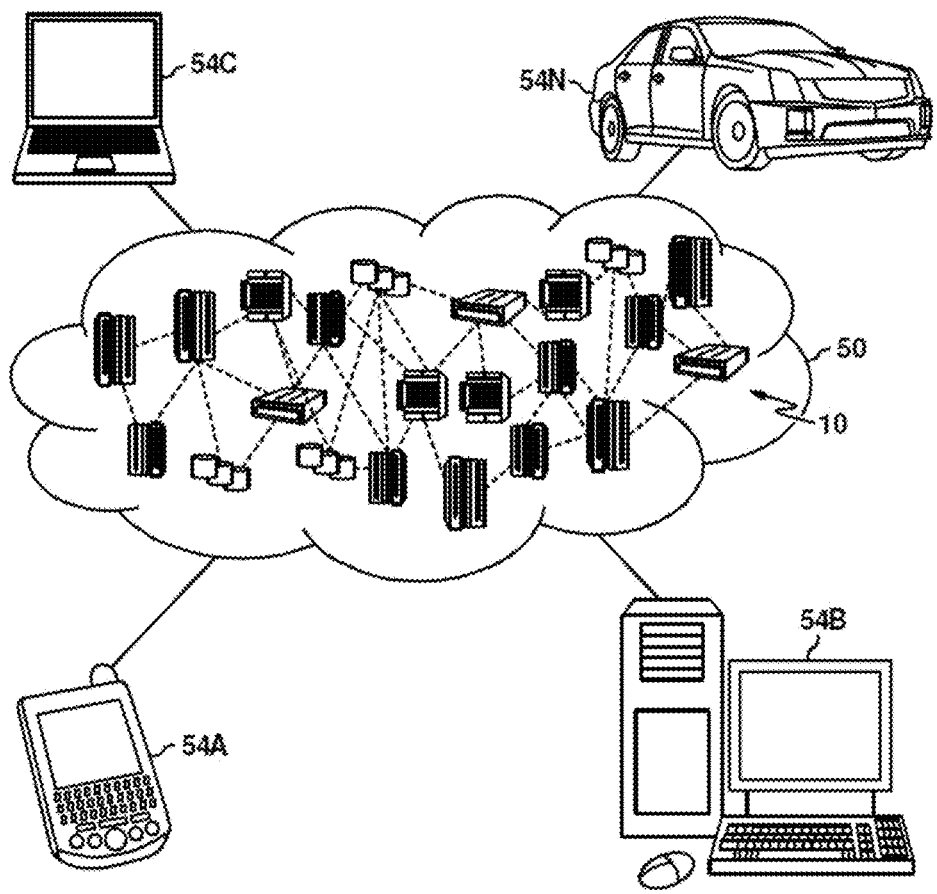
FIG. 10 depicts a cloud computing environment, in accordance with embodiments of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 10 are intended to be illustrative only and that computing nodes 10 and cloud computing environment 50 can communicate with any type of computerized device over any type of network and/or network addressable connection (e.g., using a web browser).

Figure 11:
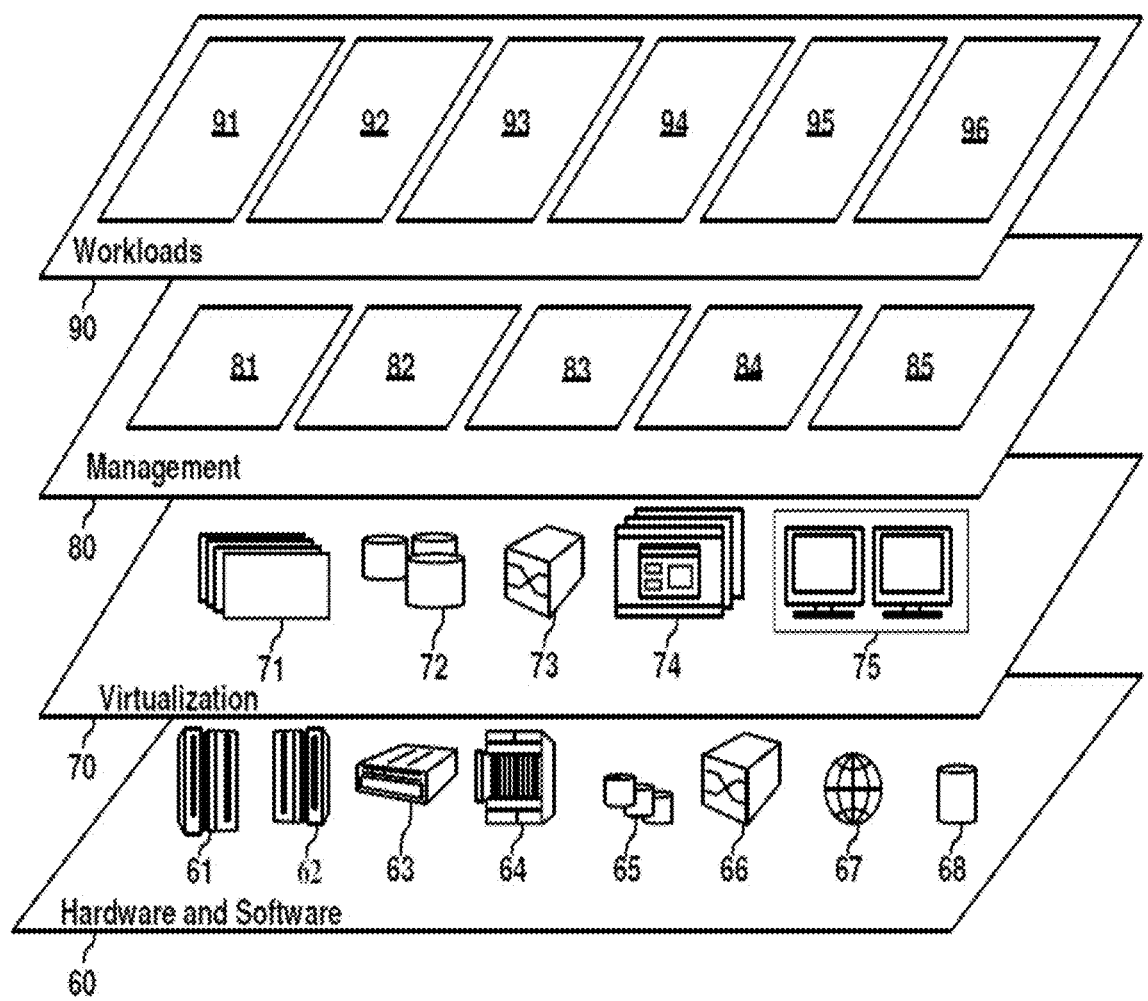
FIG. 11 depicts abstraction model layers, in accordance with embodiments of the present invention.

Referring now to FIG. 11 a set of functional abstraction layers provided by cloud computing environment 50 (see FIG. 10) are shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and custom GUI creation 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating a customized user interface showing a state of drilling operations at successive levels of drilling operations, the method comprising:

receiving, by a processor of a computing system, synchronized data from a local server installed on a plurality of drilling rigs of a fleet of drilling rigs, the synchronized data comprising raw sensor data that the local server extracts from a plurality of rig sensors installed on the plurality of drilling rigs, which is initially stored in a time-series database coupled to the local server, and then asynchronously and transactionally replicated over a network to the computing system to ensure that the synchronized data is synchronized between the local server and the computing system;

transforming, by the processor, the synchronized data comprising the raw sensor data into a normalized form so that the raw sensor data is understood by the computing system to refer to a measurable of a physical component of a drilling rig;

analyzing, by the processor, the synchronized data in the normalized form with a real-time analytics engine including at least one predictive model to identify at least one drilling operation event associated with the drilling rig from the synchronized data;

applying, by the processor, logic rules to calibrate outputs of the real-time analytics engine to determine a set of key performance indicators for the at least one drilling operation event from the drilling rig, wherein the applying logic rules creates values for calculating the set of key performance indicators, the values being critical modeling precursors that are fed through a series of advanced data transformations and predictive modeling routines to isolate signals corresponding to specific key performance indicator events of interest, wherein the signals are filtered, further wherein the applying includes translating operational movements of the plurality of drilling rigs derived from the synchronized data into data to be processed by the real-time analytics engine at a second-to-second level;

generating, by the processor, the customized user interface to be accessed by a user computing device to visualize the set of key performance indicators, wherein the customized user interface indicates a recommended change in drilling operations based on an analysis of the set of key performance indicators;

modifying, by the processor, a drilling operation based on user interactions with the customized user interface to at least one of: prevent further damage to drilling components in an event of a failing component, eliminate an inefficiency with a particular drilling operation event, and increase an efficiency of the drilling operation by propagating a successful drilling operation event to other drilling rigs in a fleet; and augmenting, by the processor, the customized user interface in real-time to display updated key performance indicators at successive levels of operation.

2. The method of claim 1, wherein the customized user interface is further configured based on a user level of access associated such that a user possessing a required level of access is presented with additional information about the state of drilling operations at successive levels of the drilling operation operations.

3. The method of claim 1, wherein the set of key performance indicators are determined at various levels including an individual rig level, a rig class level, an area level, and a fleet level.

4. The method of claim 1, wherein the customized interface further indicates correlations between key performance indicators and drilling operation events.

5. The method of claim 1, wherein identifying the at least one drilling operation event by the real-time analytics engine includes determining both a type of drilling operation event and when the at least one drilling operation event occurred.

6. A computing system, comprising:
a processor;
a memory device coupled to the processor; and
a computer readable storage device coupled to the processor, wherein the storage device contains program code executable by the processor via the memory device to implement a method for generating a customized user interface showing a state of drilling operations at successive levels of drilling operations, the method comprising:
receiving, by the processor, synchronized data from a local server installed on a plurality of drilling rigs of a fleet of drilling rigs, the synchronized data comprising raw sensor data that the local server extracts from a plurality of rig sensors installed on the plurality of drilling rigs, which is initially stored in a time-series database coupled to the local server, and then asynchronously and transactionally replicated over a network to the computing system to ensure that the synchronized data is synchronized between the local server and the computing system;
transforming, by the processor, the synchronized data comprising the raw sensor data into a normalized form so that the raw sensor data is understood by the computing system to refer to a measurable of a physical component of a drilling rig;
analyzing, by the processor, the synchronized data in the normalized form with a real-time analytics engine including at least one predictive model to identify at least one drilling operation event associated with the drilling rig from the synchronized data;
applying, by the processor, logic rules to calibrate outputs of the real-time analytics engine to determine a set of key performance indicators for the at least one drilling operation event from the drilling rig, wherein the applying logic rules creates values for calculating the set of key performance indicators, the values being critical modeling precursors that are fed through a series of advanced data transformations and predictive modeling routines to isolate signals corresponding to specific key performance indicator events of interest, wherein the signals are filtered, further wherein the applying includes translating operational movements of the plurality of drilling rigs derived from the synchronized data into data to be processed by the real-time analytics engine at a second-to-second level;

generating, by the processor, the customized user interface to be accessed by a user computing device to visualize the set of key performance indicators, wherein the customized user interface indicates a recommended change in drilling operations based on an analysis of the set of key performance indicators;

modifying, by the processor, a drilling operation based on user interactions with the customized user interface to at least one of: prevent further damage to drilling components in an event of a failing component, eliminate an inefficiency with a particular drilling operation event, and increase an efficiency of the drilling operation by propagating a successful drilling operation event to other drilling rigs in a fleet; and augmenting, by the processor, the customized user interface in real-time to display updated key performance indicators at successive levels of operation.

7. The computing system of claim 6, wherein the customized user interface is further configured based on a user level of access associated such that a user possessing a required level of access is presented with additional information about the state of drilling operations at successive levels of the drilling operation operations.

8. The computing system of claim 6, wherein the set of key performance indicators are determined at various levels including an individual rig level, a rig class level, an area level, and a fleet level.

9. The computing system of claim 6, wherein the customized interface further indicates correlations between key performance indicators and drilling operation events.

10. The computing system of claim 6, wherein identifying the at least one drilling operation event by the real-time analytics engine includes determining both a type of drilling operation event and when the at least one drilling operation event occurred.

11. A computer program product, comprising a non-transitory computer readable hardware storage device storing a computer readable program code, the computer readable program code comprising an algorithm that when executed by a computer processor of a computing system implements a method for generating a customized user interface showing a state of drilling operations at successive levels of drilling operations, the method comprising:
receiving, by a processor of a computing system, synchronized data from a local server installed on a plurality of drilling rigs of a fleet of drilling rigs, the synchronized data comprising raw sensor data that the local server extracts from a plurality of rig sensors installed on the plurality of drilling rigs, which is initially stored in a time-series database coupled to the local server, and then asynchronously and transactionally replicated over a network to the computing system to ensure that the synchronized data is synchronized between the local server and the computing system;

transforming, by the processor, the synchronized data comprising the raw sensor data into a normalized form so that the raw sensor data is understood by the computing system to refer to a measurable of a physical component of a drilling rig;

analyzing, by the processor, the synchronized data in the normalized form with a real-time analytics engine including at least one predictive model to identify at least one drilling operation event associated with the drilling rig from the synchronized data;

applying, by the processor, logic rules to calibrate outputs of the real-time analytics engine to determine a set of key performance indicators for the at least one drilling operation event from the drilling rig, wherein the applying logic rules creates values for calculating the set of key performance indicators, the values being critical modeling precursors that are fed through a series of advanced data transformations and predictive modeling routines to isolate signals corresponding to specific key performance indicator events of interest, wherein the signals are filtered, further wherein the applying includes translating operational movements of the plurality of drilling rigs derived from the synchronized data into data to be processed by the real-time analytics engine at a second-to-second level;

generating, by the processor, the customized user interface to be accessed by a user computing device to visualize the set of key performance indicators, wherein the customized user interface indicates a recommended change in drilling operations based on an analysis of the set of key performance indicators;

modifying, by the processor, a drilling operation based on user interactions with the customized user interface to at least one of: prevent further damage to drilling components in an event of a failing component, eliminate an inefficiency with a particular drilling operation event, and increase an efficiency of the drilling operation by propagating a successful drilling operation event to other drilling rigs in a fleet; and augmenting, by the processor, the customized user interface in real-time to display updated key performance indicators at successive levels of operation.

12. The computer program product of claim 11, wherein the customized user interface is further configured based on a user level of access associated such that a user possessing a required level of access is presented with additional information about the state of drilling operations at successive levels of the drilling operation operations.

13. The computer program product of claim 11, wherein the set of key performance indicators are determined at various levels including an individual rig level, a rig class level, an area level, and a fleet level.

14. The computer program product of claim 11, wherein identifying the at least one drilling operation event by the real-time analytics engine includes determining both a type of drilling operation event and when the at least one drilling operation event occurred.

* * * * *